(12) United States Patent
Paternostre

(10) Patent No.: US 12,389,836 B1
(45) Date of Patent: Aug. 19, 2025

(54) ROOTING TRAY

(71) Applicant: Joep Paternostre, Waynesboro, VA (US)

(72) Inventor: Joep Paternostre, Waynesboro, VA (US)

(73) Assignee: Bloomaker USA, Inc., Waynesboro, VA (US)

( * ) Notice: Subject to any disclaimer, the term of this patent is extended or adjusted under 35 U.S.C. 154(b) by 1 day.

(21) Appl. No.: 18/296,135

(22) Filed: Apr. 5, 2023

(51) Int. Cl.
*A01G 9/08* (2006.01)

(52) U.S. Cl.
CPC .................... *A01G 9/086* (2013.01)

(58) Field of Classification Search
CPC ... A01G 9/02; A01G 5/04; A01G 9/04; A01G 9/042; A01G 2009/003; A47G 7/07; B65D 85/52
See application file for complete search history.

(56) References Cited

U.S. PATENT DOCUMENTS

| | | | | |
|---|---|---|---|---|
| 6,038,812 | A * | 3/2000 | Belokin | A01G 5/04 40/430 |
| 6,263,614 | B1 * | 7/2001 | Koo | A01G 5/04 47/41.13 |
| 6,457,276 | B1 * | 10/2002 | Masters | A47G 7/07 47/41.01 |
| 7,448,162 | B2 | 11/2008 | Paternostre et al. | |
| 7,963,407 | B2 * | 6/2011 | Donnellan | A47B 49/00 211/70 |
| D742,784 | S * | 11/2015 | Harms | D11/152 |
| D790,392 | S * | 6/2017 | Paternostre | D11/143 |
| D791,013 | S * | 7/2017 | Paternostre | D11/143 |
| D796,921 | S | 9/2017 | Paternostre et al. | |
| D797,528 | S | 9/2017 | Paternostre et al. | |
| D798,677 | S | 10/2017 | Paternostre et al. | |
| 11,412,665 | B2 * | 8/2022 | Wang | A01G 9/028 |
| 2001/0034972 | A1 * | 11/2001 | Masters | A47G 7/07 47/58.1 CF |
| 2006/0288641 | A1 * | 12/2006 | Cardamone | A01G 5/04 47/41.01 |
| 2008/0244968 | A1 * | 10/2008 | Meisinger | A01G 5/04 47/41.01 |
| 2019/0098847 | A1 * | 4/2019 | Paternostre | A01G 9/028 |
| 2022/0246068 | A1 | 8/2022 | Paternostre | |

* cited by examiner

*Primary Examiner* — Trinh T Nguyen
(74) *Attorney, Agent, or Firm* — Tuggle Duggins P.A.; Reinier R. Smit; Blake P. Hurt

(57) ABSTRACT

A rooting tray for supporting a plant, typically a bulbous plant, as it grows. The rooting tray includes a raised platform supported by a lower frame, and the raised platform defines one or more passageways that urge a direction of root growth of the plant below the raised platform. The raised platform is supported by a plurality of frame supports integrally formed around the periphery of the lower frame and raised outer frame. The raised platform also defines a plurality of pins extending above the raised platform. The rooting tray further includes one or more legs that elevate the lower frame above a base of a container to provide ample space for the roots to grow into and preferably entangle with other roots or around portions of the rooting tray.

20 Claims, 6 Drawing Sheets

FIG. 6

ROOTING TRAY

FIELD OF THE INVENTION

The disclosure herein pertains to a device, system, and method for rooting plants generally, and particularly pertains to a rooting tray that secures a plant during growth and urges the direction of root growth to promote healthy flower growth and more beneficial root entanglement.

DESCRIPTION OF THE PRIOR ART AND OBJECTIVES OF THE INVENTION

Hydroponics is a type of horticulture that involves growing plants without using soil as a substrate, and often utilizes a support device to secure the plant as the plant grows. Hydroponic systems use a nutrient-rich solution including nutrients and other essential elements to create an environment where plants can grow. Common hydroponic plant species include, for example, terrestrial plant species such as tulips, daffodils, hyacinth, amaryllis, lilies, chrysanthemums, iris, and freesias. A terrestrial plant species is one that has both root and shoot systems—the shoot system includes the stem, leaves, and flowers. The root system provides sustenance to the shoot system by absorbing air, water, and other essential nutrients from the nutrient-rich solution and providing these essential nutrients to the rest of the plant. The root system also provides a means for anchoring the plant firmly in the ground, or, in the case of hydroponics, to the support device. Anchoring the plant prevents the shoot system from falling or tipping over during growth, transportation, or other environmental conditions.

Hydroponics has become a very promising method of growing plants because of its small spatial footprint, lessened environmental impact, higher yields, and ease of controlling the environment in which the plant grows. Although hydroponics does not utilize soil substrates, other substrates may still be used, such as rockwool, stones, sand, and foam. Although these substrates may provide adequate support as the plant grows, they obstruct a consumer's view of the root system, a part of the plant that is constantly growing, and therefore desirable for any consumer to view.

As the plant grows, the root system constantly propagates in various directions in search of nutrients necessary for healthy plant growth, including but not limited to, the nutrient solution, air, and light. This constant propagation tends to cause the roots to entangle with one another, which may be advantageous for anchoring the plant to the support device if the entanglement takes placed below the support device. If root entanglement takes place above the support device, it can be disadvantageous because the roots fail to entangle or anchor to the support device. This lack of mechanical support may result in the plants tipping over due to the inability of the root system to support the shoot system. Mechanically speaking, the root system provides greater anchoring capability when root entanglement occurs below the support device rather than above the support device.

When plants are securely anchored in an upright manner, the plant can focus its energy in growing large and healthy shoots, rather than larger roots. Supporting the plant upright during the early stages of plant growth allows the plant to focus its energy on producing healthier (e.g., larger, stronger, and more colorful) flowers. Larger, stronger, and more colorful plants are more attractive to consumers, therefore, securing the plant in an upright orientation, results in a higher quality product that is more appealing to consumers and therefore can be easily marketed.

Additionally, because hydroponic plants are typically grown in rooting containers, which are different from their final marketed display container, such as a vase, the support devices must be able to be moved in and out of the rooting container without causing the plant to tip over and/or fall off the support device. Furthermore, when placed in their final marketed display container, the plants are subjected to various erratic forces during transportation, therefore, the support device must facilitate sufficient anchoring such that the plant does not tip over or jostle around on the support device during transportation.

Attempts to maintain hydroponic plants in an upright orientation during growth, transportation, and display often are not transferrable from rooting container to a final marketed display container, hinder the display of portions of the root and shoot systems, and/or fail to manage the location of the root entanglement. For these reasons, it is advantageous to have a support device that is easily handled and transferred, allows unhindered viewing of the entire plant, and can provide a sufficient means for anchoring the root system to ensure the plants do not tip over or jostle around on the support device during movement of the support device during growing and transportation.

Thus, in view of the problems and disadvantages associated with prior art devices, the present disclosure was conceived and one of its objectives is to provide a rooting tray for hydroponic plants that is easily handled and transferrable between various containers.

It is another objective of the present disclosure to provide a rooting tray for hydroponic plants that does not obstruct a consumer's view of the plant, particularly the root system.

It is still another objective of the present disclosure to provide a rooting tray that provides and promotes sufficient anchoring of the root system of the plant to ensure that the plant remains upright and does not tip over or jostle around the rooting tray.

It is yet another objective of the present disclosure to provide a rooting tray for hydroponic plants configured to urge a direction of root growth to promote root entanglement below a raised platform of the rooting tray.

It is still a further objective of the present disclosure to provide a rooting tray for hydroponic plants that includes a raised platform and a lower support frame, wherein the raised platform defines one or more passageways that urge and provide room for the roots to grow and entangle below the raised platform.

It is a further objective of the present disclosure to provide a rooting tray for hydroponic plants that is easily, affordably, and environmentally friendly to manufacture.

It is yet another objective of the present disclosure to provide a rooting tray for hydroponic plants that is easily stackable when there are no plants placed on the rooting tray.

Additional features and advantages of the disclosure will be set forth in the description which follows, and in part will be obvious from the description, or may be learned by the practice of the disclosure. The disclosed aspects of the disclosure herein are merely exemplary as the disclosure may be embodied in various forms. Therefore, the disclosure is not limited in its application to the specific structural and functional details disclosed and not the arrangements of the components set forth in the following description or illustrated in the drawings. The disclosure is capable of other embodiments and of being practiced and carried out in other ways. As such, those skilled in the art will appreciate that the conception upon which the distinction of the disclosure is based, may readily be utilized as a basis for designing other structures and methods for carrying out the disclosure.

SUMMARY OF THE INVENTION

The aforesaid and other objectives are realized by providing a rooting tray for supporting a plant and providing structure for anchoring a root system of a plant, typically a bulbous plant. The rooting tray includes a raised platform supported by a lower frame, and the raised platform defines one or more passageways that urge a direction of root growth of the plant below the raised platform. The raised platform also forms a plurality of pins extending above the raised platform for securing the plant on the raised platform, particularly when a root system of the plant has not yet fully matured or anchored to the rooting tray. As the root system of the plant grows larger and matures, the roots become longer and are channeled through the passageways to a space below the raised platform. When the roots propagate underneath the raised platform, they tend to entangle with one another below the raised platform, as well as around portions of the rooting tray. Forcing root entanglement to occur below the raised platform increases the ability of the roots to anchor to the raised rooting tray and other roots, which provides support for the plant to grow in a healthy and upright manner.

In the preferred embodiment, the rooting tray includes one or more legs that elevate the lower frame above a base of a container to provide ample space for the roots to grow into and preferably entangle with other roots or around portions of the rooting tray. The preferred embodiment includes a plurality of pins extending above the raised platform and a plurality of legs extending below the lower frame, and the pins and legs are both hollow forming a channel enabling multiple rooting trays to stack in a compact and simple manner when plants are not placed on the rooting tray.

In the beginning stages of use, one or more plants are placed between a plurality of pins, and subsequently the rooting tray is placed in an environment that promotes growth of the root system and shoots system of the plant. Because at the beginning stages of growth the root system of the plant is small and typically unable to support the plant in an upright position, the plurality of pins provide the necessary support to maintain the plant upright while the root system grows. When plants, such as flower bulbs, are pressed between the plurality of pins, it is important that the pins do not pierce the basal or tunic to the extent that the bulb is damaged. For this reason, the pins only extend above the raised platform a height that is necessary to provide that initial support during the early stages of growth. The pins are configured (i.e., shaped, sized, and otherwise capable of) to allow the basal of the bulb to be positioned overtop the passageways to ease root growth through the passageways and into the space below the raised platform.

As the root system begins to mature and grow larger, the one or more passageways defined in the raised platform urge the direction of root growth below the raised platform. After the roots grow into the space below the raised platform, they will entangle around portions of the raised rooting tray or with root systems of other plants placed on the raised platform. As the roots continue to grow larger and mature, root entanglement will increase, and the roots will become more entwined with portions of the raised rooting tray and/or with roots of other plants placed on the raised platform, resulting in a plant that tends to remain upright and secured to the rooting tray.

BRIEF DESCRIPTION OF THE DRAWINGS

FIG. 6 features a top plan view of the rooting tray of FIG. 1;

DETAILED DESCRIPTION OF THE PREFERRED EMBODIMENT AND OPERATION OF THE INVENTION

Figure 1:
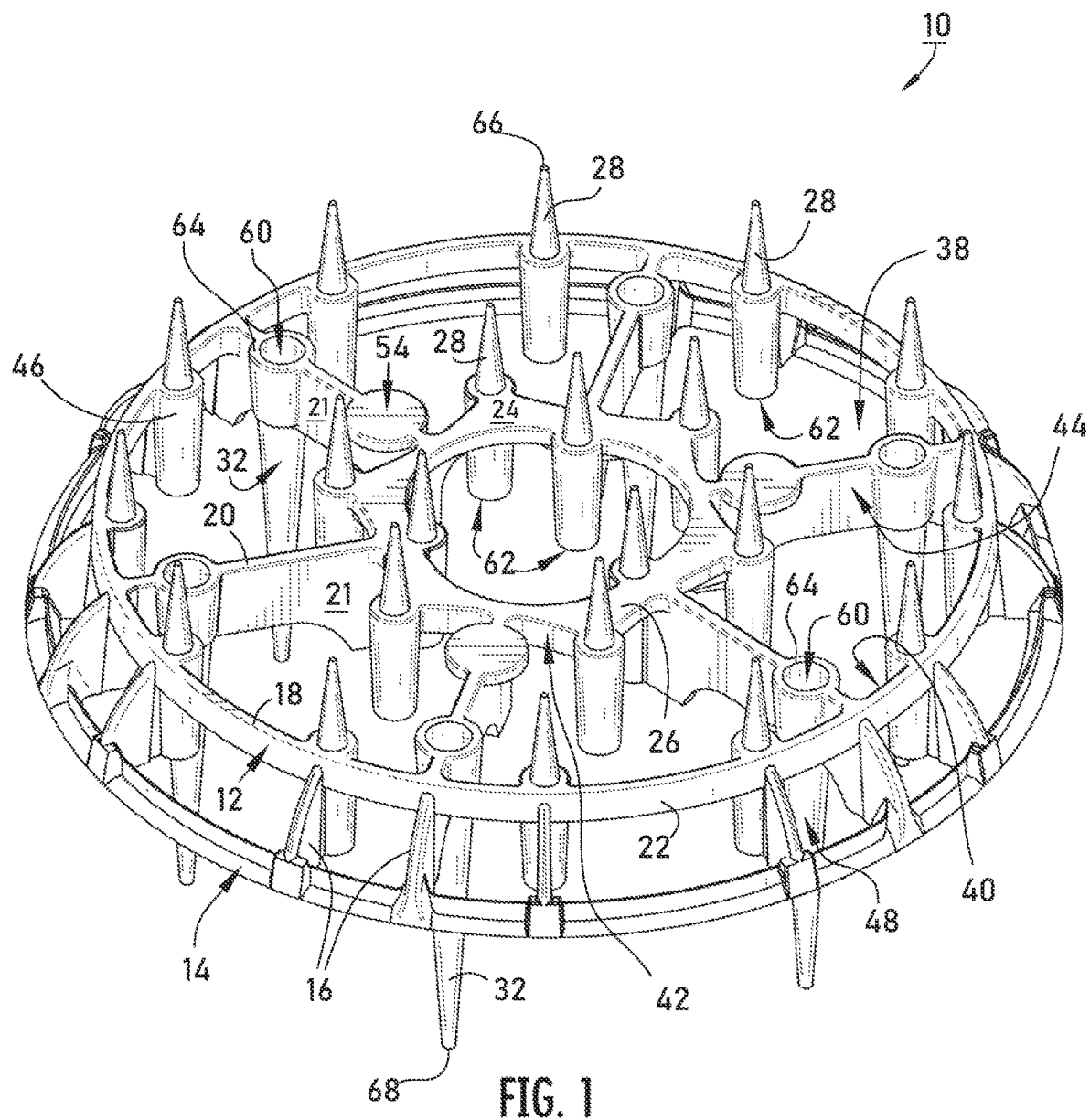
FIG. 1 shows a perspective view of the rooting tray of the instant disclosure.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

Figure 6:
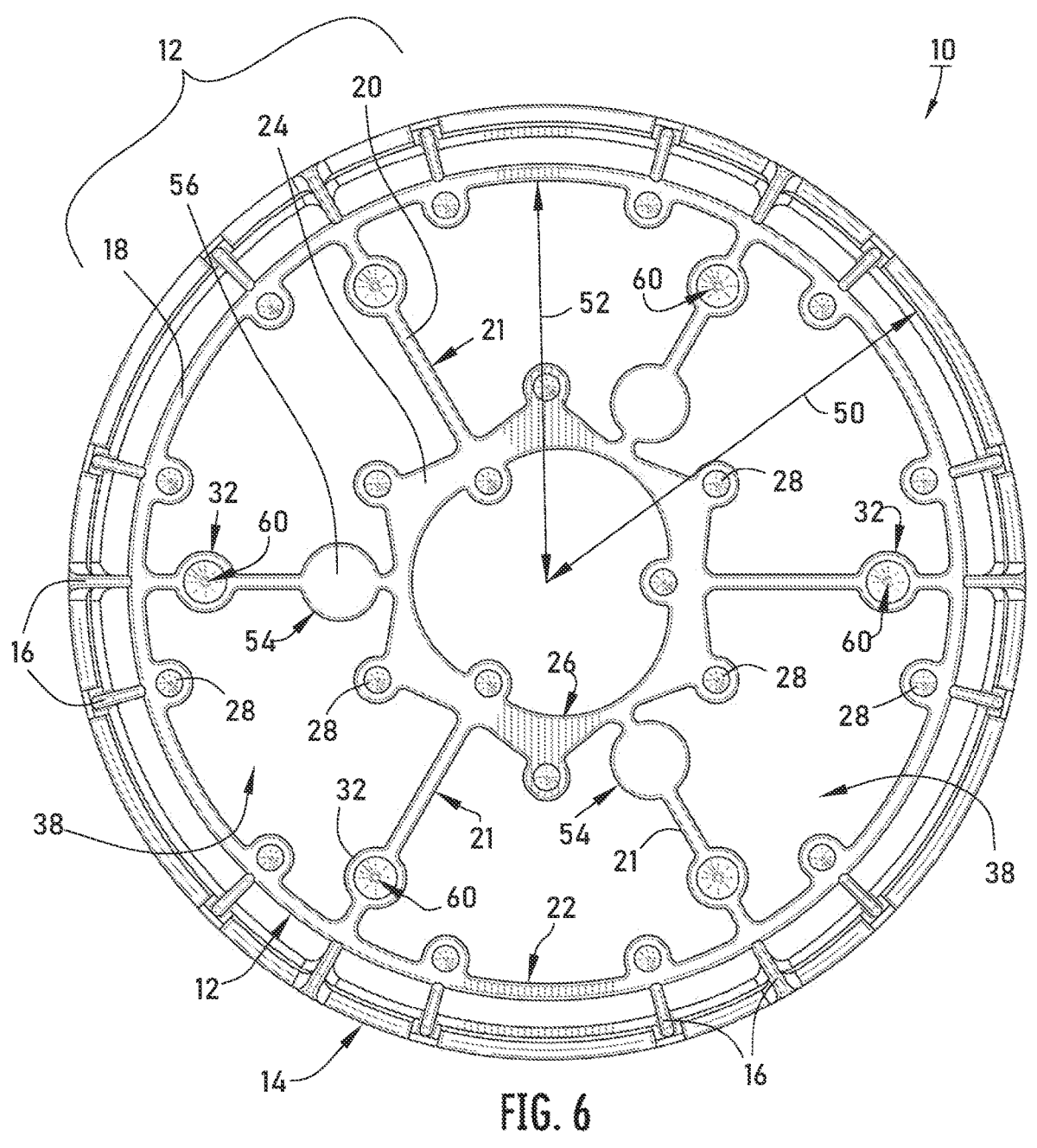

For a better understanding of the disclosure and its operation, turning now to the drawings, FIGS. 1-8 illustrate a preferred embodiment of a rooting tray for a hydroponic plant, typically a bulbous plant, the rooting tray 10 may include a raised platform 12 connected to a lower frame 14 by a frame support 16. The raised platform 12 is preferably formed by an upper surface 18, 20 of a raised outer frame 22 and a rib 21, respectively. The frame support 16 facilitates the connection between the raised outer frame 22 and the lower frame 14. The ribs 21 may extend interiorly from one or more of the frame supports 16 from the raised outer frame 22 towards a center of the raised outer frame 22. In the preferred embodiment, the frame supports 16 facilitate the connection between the raised outer frame 22 and the lower frame 14 and elevate the raised outer frame 22 above the lower frame 14. The frame supports 16 may be integrally formed along the exterior periphery of the raised outer frame 22 and the lower frame 14. In the preferred embodiment (as shown in the FIGS. 1-8) the raised platform 12 is further formed by an upper surface 24 of a raised inner frame 26 positioned within the raised outer frame 22. In this preferred embodiment, a plurality of ribs 21 extend between the raised outer frame 22 and the raised inner frame 26 and structurally support the raised inner frame 26 within the raised outer frame 22. In other embodiments (not shown), the rooting tray 10 may not include a raised inner frame 26. In embodiments without the raised inner frame 26, the ribs 21 may extend between two endpoints on the periphery of the raised outer frame 22, which may be a diameter 52 as seen in FIG. 6 of the raised outer frame 22. In the preferred embodiment, the frame supports 16 facilitate the connection between the lower frame 14 and the outer frame 22, so that the raised platform 12 is elevated approximately 0.54 inches (+/−0.25 inches), 13.70 centimeters (+/−0.635 centimeters) above the lower frame 14. In one or more other embodiments, it may be desirable for the raised platform 12 to be elevated higher or lower than approximately 0.54 inches (+/−0.25 inches), 13.70 centimeters (+/−0.635 centimeters) above the lower frame 14, depending on the size of the root system of the plant, or bulb.

The preferred embodiment of raised platform 12 further includes a plurality of pins 28 configured to extend a predetermined height 30 above the raised platform 12 to secure the plant, typically a bulbous plant, on the raised platform 12, particularly when the root system has not fully matured and/or anchored to the rooting tray 10. In the preferred embodiment, the pins 28 are integrally formed, some with portions of the raised outer frame 22, some with portions of the raised inner frame 26, and some with portions of the frame supports 16. In one or more other embodiments, the pins 28 are integrally formed with other features of the rooting tray 10 such as one or more portions of the lower frame 14 or one or more portions of the ribs 21 that extend between the raised outer frame 22 and the raised inner frame 26. The pins 28 are configured (sized, shaped, otherwise capable of) and arranged to support the plant, typically a plant bulb, without piercing the bulb and causing damage. The pin 28 configuration may allow any number of plants, or bulbs, to be generally evenly spaced around the raised platform 12. The pin 28 preferably support the bulb in a substantially upright orientation with the basal of the bulb directly overtop a passageway 38, formed in the raised platform 12, to case the direction of root growth. In the preferred embodiment, the predetermined height 30 of the pins 28 is approximately 0.440 inches (+/−0.25 inches), 11.18 centimeters (+/−0.635 centimeters). In other embodiments the predetermined height 30 of the pins 28 may be larger or smaller than 0.440 inches (+/−0.25 inches), 11.18 centimeters (+/−0.635 centimeters), depending on the size of the plant, or bulb.

Figure 2:
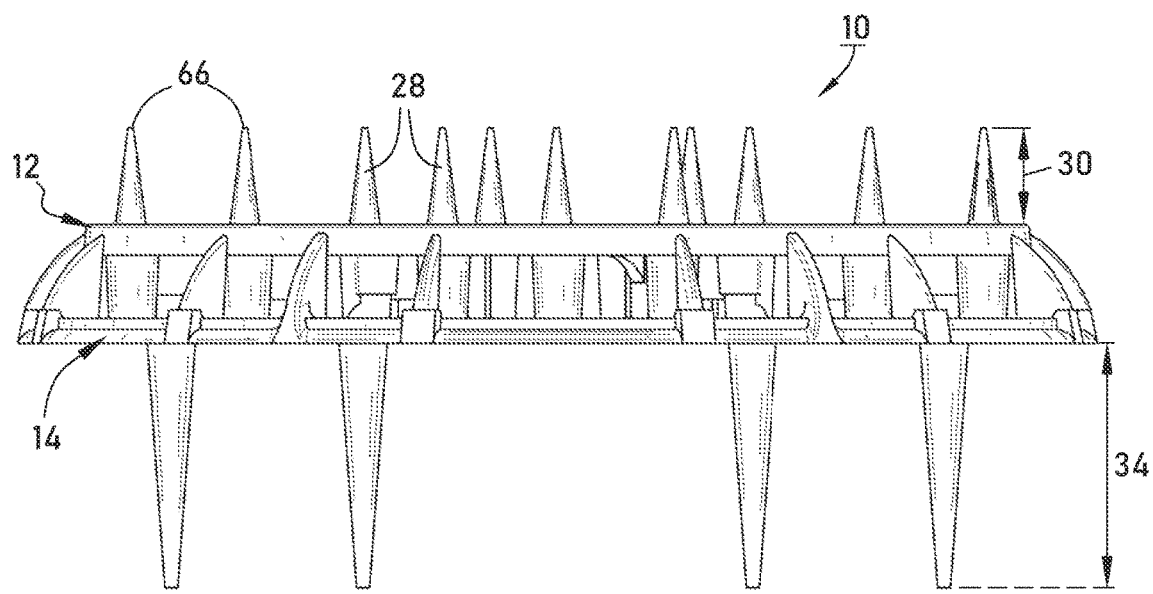
FIG. 2 pictures a front elevational view of the rooting tray of FIG. 1.
Figure 3:
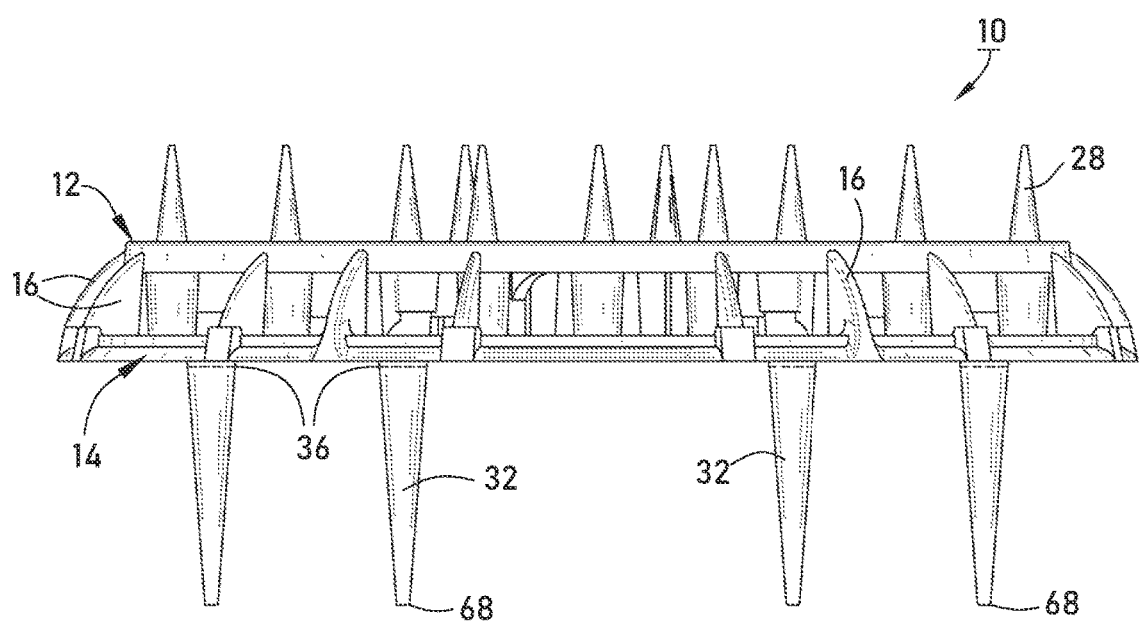
FIG. 3 depicts a rear elevational view of the rooting tray of FIG. 1.

As best seen in FIGS. 1 and 2, in a preferred embodiment, the rooting tray 10 may include a leg 32 configured to elevate the lower frame 14, and therefore the raised platform 12, above a base of a rooting container or a display container 80. The legs 32 extend a predetermined length 34 (FIG. 2) below the lower frame 14 to create ample space for the root system to grow into and entangle with other roots from the same plant or different plants and/or entangle around portions of the rooting tray 10. In one or more embodiments, when the rooting tray 10 is placed in standing or moving nutrient solution it is desirable that the legs 32 extend a predetermined length 34 below the lower frame 14 so that the shoot system and/or bulb of the plant is not submerged in the nutrient solution either partially or fully. In a preferred embodiment, the predetermined length 34 of the leg 32 is approximately 1.109 inches (+/−0.5 inches), 28.16 centimeters (+/−1.27 centimeters). In other embodiments, it may be desirable for the predetermined length 34 of the legs 32 to be larger or smaller than approximately 1.109 inches (+/−0.5 inches), 28.16 centimeters (+/−1.27 centimeters), depending on the size of the root system of the plant, or bulb. Additionally, when the legs 32 are responsible for elevating the rooting tray 10 above the base of the container 80, the predetermined length 34 of the legs 32 determines the total volume of nutrient solution below the raised platform 12. In other embodiments, the legs 32 may not be responsible for elevating the rooting tray 10 within the container, instead the container 80 in which the rooting tray 10 is placed is configured to support the rooting tray 10 a predetermined distance above the base of the container 80.

Figure 4:
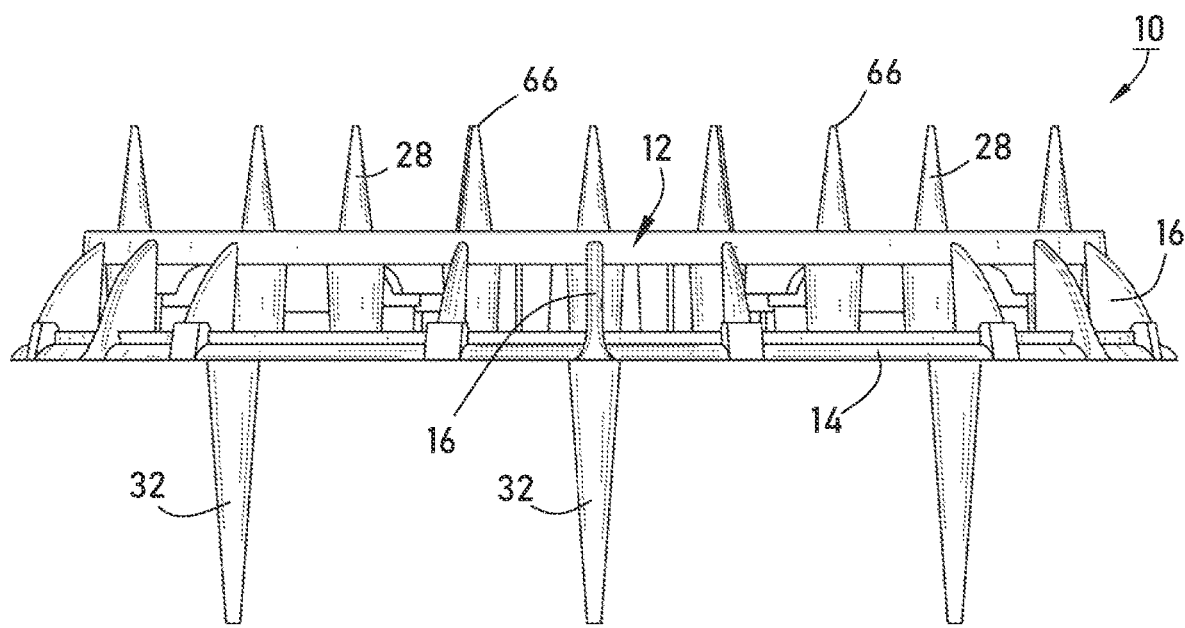
FIG. 4 demonstrates a right-side elevational view of the rooting tray of FIG. 1.
Figure 5:
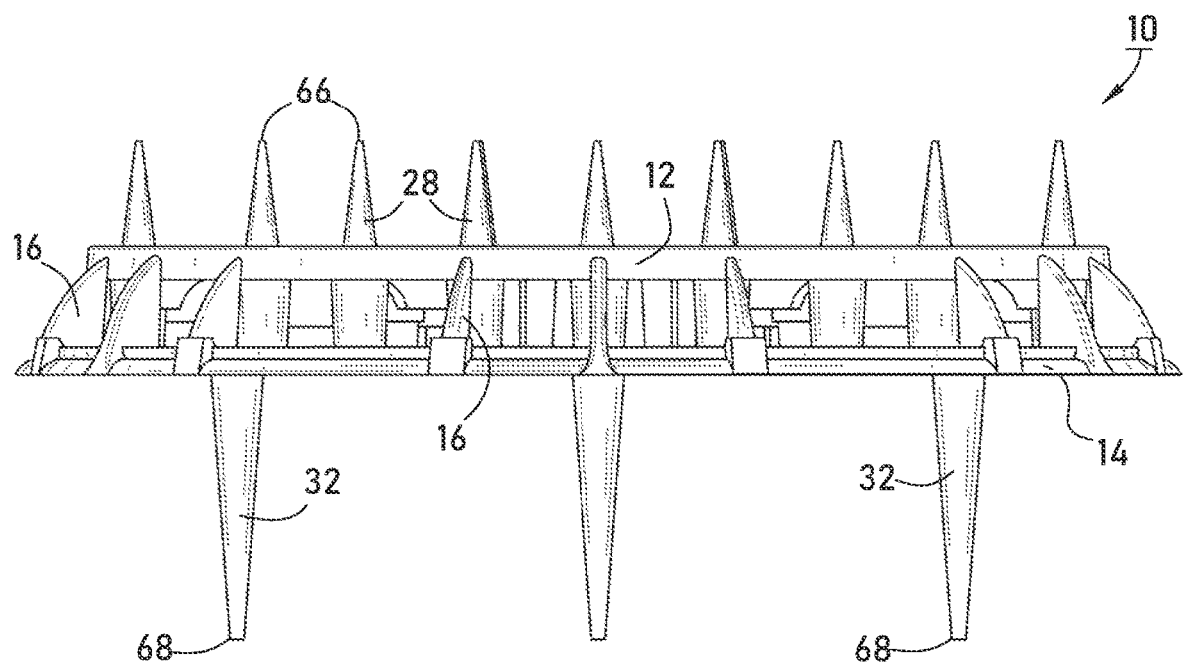
FIG. 5 illustrates a left-side elevational view of the rooting tray of FIG. 1.
Figure 7:
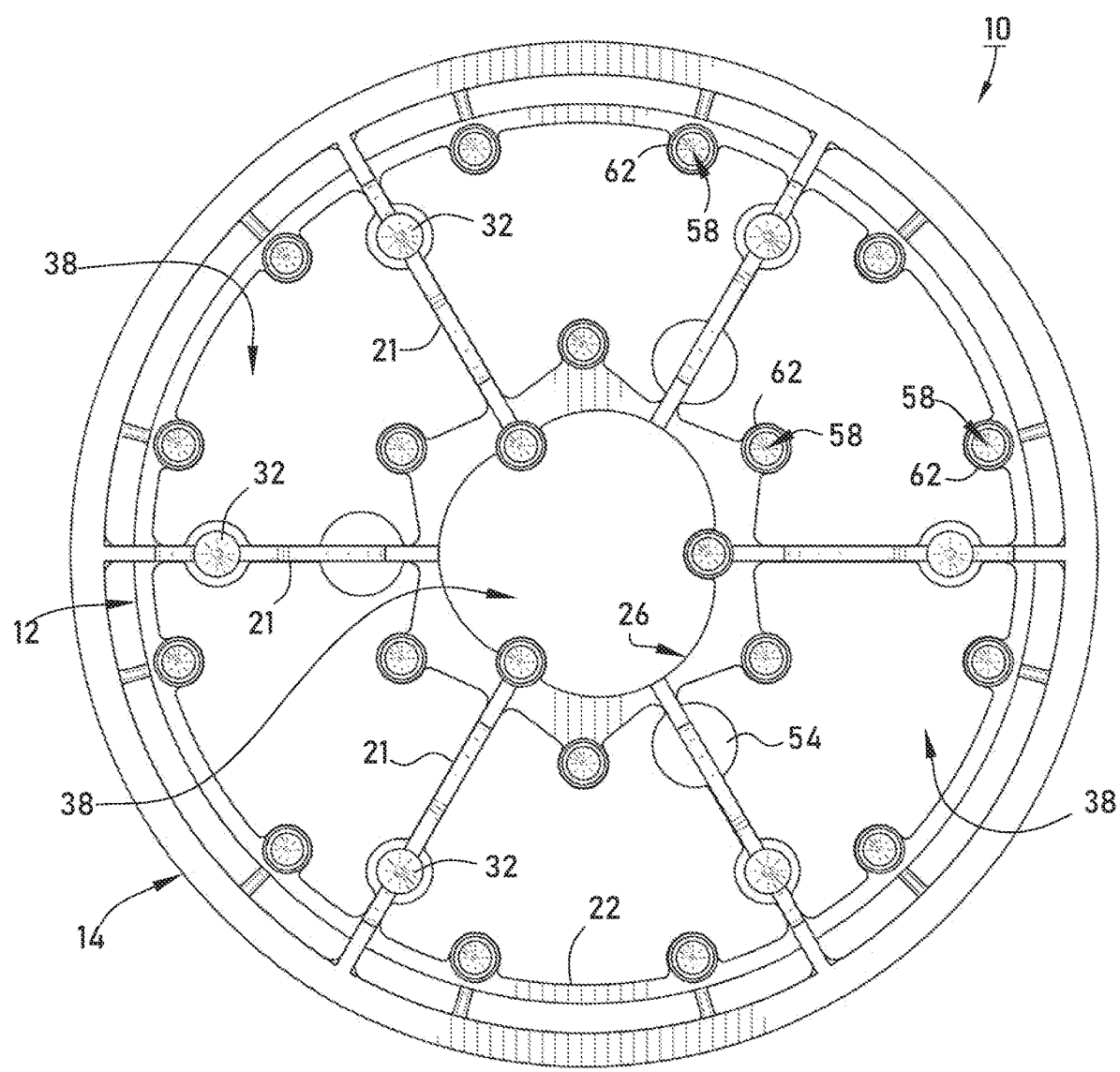
FIG. 7 shows a bottom plan view of the rooting tray of FIG. 1.
Figure 8:
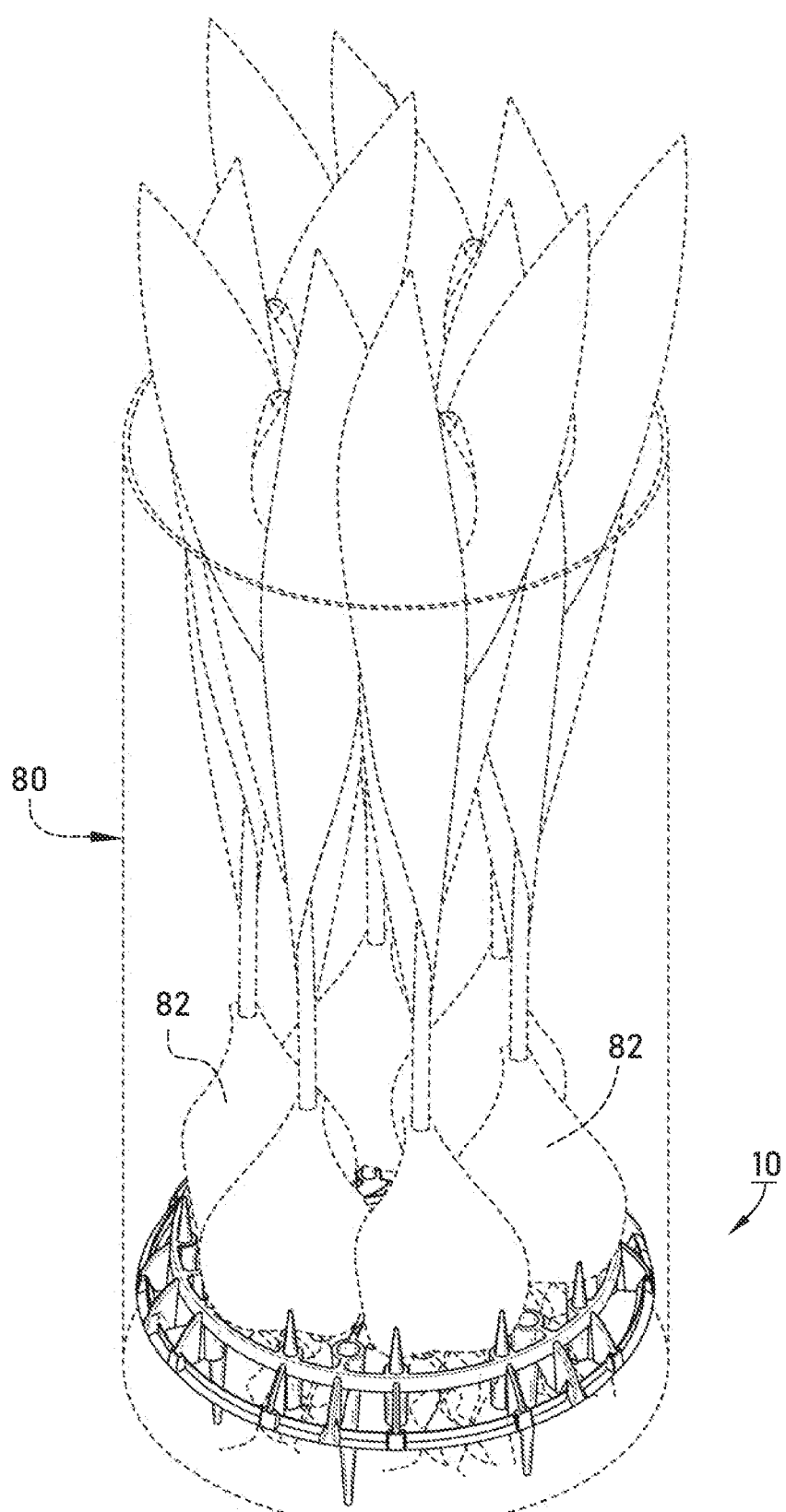
FIG. 8 illustrates a perspective view of the rooting tray of FIG. 1 in a typical operating environment with a container and a plurality of rooting plants illustrated in broken lines.

In a preferred embodiment, the rooting tray 10 may include a plurality of legs 32, optimally six legs 32, evenly distributed throughout the rooting tray 10. In the preferred embodiment, the legs 32 are integrally formed with a portion of the ribs 21 that extend between the raised outer frame 22 and the raised inner frame 26. In one or more other embodiments, the legs 32 are integrally formed with one or more other features of the rooting tray 10 such as a portion of the lower frame 14, a portion of the raised outer frame 22, a portion of the raised inner frame 26, and/or a portion of the frame supports 16. In other embodiments, as shown in FIG. 4, the legs 32 may define a perforated cut 36. With the perforated cut 36, the leg 32, or a portion thereof, is severable from the rooting tray 10. The perforated cut 36 is desirable in instances where the roots have already entangled below the raised platform 12, either with other roots or the rooting tray 10, and/or the rooting tray 10 is inserted into the container 80 configured to support the rooting tray 10 a predetermined distance above the base of the container 80 without the need of the legs 32. Removing the legs 32 would eliminate material from the rooting tray 10 and would remove a component that may slightly hinder the viewing of the root system of the plant.

The raised platform 12 defines a passageway 38 that urges a direction of root growth of the hydroponic plant below the raised platform 12. In the preferred embodiment, the raised platform 12 is formed by upper surfaces 18, 24, 20 of the raised outer frame 22, the raised inner frame 26, and the plurality of ribs 21, respectively. The passageway 38 is configured to provide room that facilitates unimpeded root growth in the direction of the space below the raised platform 12. The volume of the space below the raised platform 12 is determined by the length 34 of the legs 32. In the preferred embodiment, the passageway 38 is formed by a sidewall surface 40 of the raised outer frame 22, a sidewall surface 42 of the raised inner frame 26, a sidewall surface 44 of at least one rib 21, a sidewall surface 46 of a plurality of pins 28, and a sidewall surface 48 of the plurality of legs 32 (best seen in FIG. 1 and FIG. 6 when viewed in tandem).

The lower frame 14 and the raised outer frame 22 may define the same shape or different shapes, including but not limited to circles, squares, rectangles, triangles, or any irregular shape. In the preferred embodiment, the lower frame 14 and raised outer frame 22 both define a circular shape, optimally the lower frame 14 and raised outer frame 22 are both configured to be concentric circles. In other embodiments, not shown, the lower frame 14 and raised outer frame 22 both define a rectangular shape. In alternative embodiments, not shown, the lower frame 14 and raised upper frame 22 both define a polygonal shape with at least three sides. The raised outer frame 22 is preferably smaller than the lower frame 14, however, in alternative embodiments the raised outer frame 22 may be the same size or larger than the lower frame 14, while remaining concentric. In the preferred embodiment, as shown in FIG. 6, the lower frame 14 has a lower diameter 50, and the raised outer frame 22 has a raised diameter 52 that is less than the lower diameter 50. The lower frame 14 and/or raised outer frame 22 are configured (i.e., sized, shaped, otherwise capable of) to slidably insert into the display container 80, such as a vase. The rooting tray 10 and the display container 80, seen in broken line in FIG. 8 form a clearance fit to allow the rooting tray 10 to easily slide into the display container 80 when the rooting tray 10 is transferred from the rooting container to the display container 80.

In the preferred embodiment (as shown in FIGS. 1-8) there is only a single raised platform 12 above the lower frame 14, however, in alternative embodiments (not shown), there may be more than one raised platform 12 that forms a tiered raised platform configuration. The rooting tray 10 may be configured (i.e., sized, shaped, and otherwise capable of) supporting and securing any number of plants, including but not limited to, three, five, seven, and eleven plants. In alternative embodiments (not shown), particularly for larger rooting trays 10, more than one raised inner frame 26 may be included to support the additional plants placed on the rooting tray 10.

The raised platform 12 may define a pick pad 54 that facilitates and allows automation integration. The pick pad 54 defines a surface 56 on the raised platform 12 that is accessible to one or more pick-and-place machines. The pick pad 54 is used for high speed, high precision placing of the rooting tray 10 on a production line. In the preferred embodiment, a plurality of pick pads 54 are formed on the raised platform 12 and are configured so that a pick-and-place machine may attach to the surface 56 of the raised platform 12 and translocate the rooting tray 10 in its entirety. In the preferred embodiment, the pick pads 54 are formed on the upper surface 20 of the ribs 21 that extend between the raised outer frame 22 and the raised inner frame 26. In other embodiments, the pick pads 54 are formed with other features of the rooting tray 10 such as the lower frame 14, the raised outer frame 22, the raised inner frame 26, and/or the frame supports 16.

The pins 28 and legs 32 may form hollow channels 58, 60, respectively. In the preferred embodiment, a bottom end 62 of the pins 28 define an opening of the pin channel 58 and a top end 64 of the legs 32 define an opening of the leg channel 60. The pin channel 58 and leg channel 60 are configured (sized, shaped, or otherwise capable) to receive a top end 66 of the pin 28 and a bottom end 68 of the leg, respectively, enabling multiple rooting trays 10 to stack on and tightly nestle with one another. For purposes of manufacturing the rooting tray 10, the top end 66 of each pin 28 is preferably closed and the bottom end 68 of each leg 32 is preferably closed. In other embodiments, the top ends 66, 64 and bottom ends 62, 68 of the pins 28 and legs 32, respectively, both are open such that the rooting trays 10 are still capable of stacking and tightly nestling together when plants are not placed on the rooting tray 10. The channels 58, 60 also reduce the amount of material necessary to manufacture the rooting tray 10 and make the rooting tray 10 lighter.

The rooting tray 10 is preferably manufactured out of a light and resilient material such as poly(methyl methacrylate) (PMMA), acrylonitrile butadiene styrene (ABS), nylon polyamide (PA), polycarbonate (PC), polyethylene (PE), polyoxymethylene (POM), polypropylene (PP), polystyrene (PS), thermoplastic elastomer (TPE), or thermoplastic polyurethane (TPU). The rooting tray 10 is preferably translucent so that the rooting tray 10 does not obstruct or hinder a consumer's view of the rooting system of the plant as it grows. The rooting tray is preferably waterproof and able to resist the chemicals present in the nutrient-rich solution used in hydroponic growing.

The method of using the rooting tray 10 may include one or more of the following steps. Selecting a rooting tray 10 configured (sized, shaped, otherwise capable) to slidably insert and fit into a container configured (sized, shaped, otherwise capable) to receive the rooting tray 10. The container may be a rooting container or a display container. The rooting container is typically configured to receive more than one rooting tray 10 and the display container is configured to receive a single rooting tray 10. Pressing one or more plants, typically bulbs 81, on the raised platform 12, between the plurality of pins 28 until the basal of the bulb 81 touches the raised platform 12 or is secured in a substantially upright orientation between the plurality of pins 28, preferably with the basal directly overtop a passageway 38 for ease of root growth. Placing the rooting tray 10 in the container containing a nutrient solution, the container may be a rooting container or a display container 80. If the rooting tray 10 is placed in a rooting container, growing the root system of the one or more bulbs 81 until the root system of the one or more bulbs 81 grows through the passageways 38 and below the raised platform 12, and preferably until the root system entangle with other roots from the same bulb 81 or different bulbs 81 and/or entangle around portions of the rooting tray 10. If the rooting tray 10 is placed in a rooting container, after growing the root system of one or more bulbs 81, transferring the rooting tray 10 from the rooting container to a display container 80.

The illustrations and examples provided herein are for explanatory purposes and are not intended to limit the scope of the appended claims.

I claim:

1. A device (10) for rooting a plant, the device comprising:
a raised platform (12) supported above a lower frame (14), the raised platform (12) defining a passageway (38) formed by at least one sidewall surface (40) of a raised outer frame (22) and at least one sidewall surface (40) of at least one rib (21), and a plurality of pins (28) extending above the raised platform (12);
wherein the plant is supported between the plurality of pins (28) and the passageway (38) urges a direction of root growth of the plant below the raised platform (12), and wherein the raised platform (12) and the lower frame (14) are offset.

2. The device (10) of claim 1, wherein the raised platform (12) is supported above the lower frame (14) by a frame support (16).

3. The device (10) of claim 2, wherein the frame support (16) elevates the raised platform (12) at least 0.54 inches, 13.70 centimeters, above the lower frame (14).

4. The device (10) of claim 1, wherein the raised platform (12) includes the raised outer frame (22) and a raised inner frame (26).

5. The device (10) of claim 4, wherein the raised inner frame (26) defines a portion of the passageway (38).

6. The device (10) of claim 4, wherein the raised outer frame (22) and the raised inner frame (26) are supported by the at least one rib (21) extending between the raised outer frame (22) and the raised inner frame (26).

7. The device (10) of claim 1 further comprising a leg (32) extending below the lower frame (14).

8. The device (10) of claim 7, wherein the leg (32) includes a perforated cut (36) to remove at least a portion of the leg (32).

9. The device (10) of claim 7, wherein the leg (32) forms a leg channel (60) configured to receive the leg (32) of a second device (10) for rooting a plant.

10. The device (10) of claim 1, wherein the pin (28) forms a pin channel (58) configured to receive the pin (28) of a second device (10) for rooting a plant.

11. The device (10) of claim 1, wherein the raised platform (12) defines a pick pad (54) for automation integration.

12. The device (10) of claim 1, wherein the lower frame (14) defines a circular shape.

13. The device (10) of claim 1, wherein the lower frame (14) defines a rectangular shape.

14. The device (10) of claim 1, wherein the device (10) is formed of a waterproof material.

15. The device (10) of claim 1, wherein the device (10) is formed of a translucent material.

16. The device (10) of claim 1, wherein the device (10) is configured to hold five plants.

17. The device (10) of claim 1, wherein the device (10) is configured to hold seven plants.

18. The device (10) of claim 1, wherein the device (10) is configured to hold eleven plants.

19. The device (10) of claim 1, wherein the plant is a tulip.

20. The device (10) of claim 1, wherein the plant is a hyacinth.

* * * * *